United States Patent
Jackson, Jr.

(10) Patent No.: US 9,651,158 B2
(45) Date of Patent: May 16, 2017

(54) SHAPE MEMORY ALLOY VALVE

(71) Applicant: A. Raymond & Cie, Grenoble (FR)

(72) Inventor: Nicholas Jackson, Jr., Davisburg, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 14/938,456

(22) Filed: Nov. 11, 2015

(65) Prior Publication Data

US 2016/0061332 A1 Mar. 3, 2016

Related U.S. Application Data

(62) Division of application No. 13/795,176, filed on Mar. 12, 2013, now Pat. No. 9,212,754.

(51) Int. Cl.

| | |
|---|---|
| *F16K 1/22* | (2006.01) |
| *F16K 17/38* | (2006.01) |
| *F16K 31/02* | (2006.01) |
| *G05D 23/185* | (2006.01) |
| *F16K 31/00* | (2006.01) |
| *F16K 25/00* | (2006.01) |
| *F16K 27/02* | (2006.01) |
| *F16K 5/06* | (2006.01) |
| *F16K 27/06* | (2006.01) |

(52) U.S. Cl.
CPC .............. *F16K 1/221* (2013.01); *F16K 5/06* (2013.01); *F16K 5/0652* (2013.01); *F16K 17/386* (2013.01); *F16K 25/005* (2013.01); *F16K 27/0218* (2013.01); *F16K 27/067* (2013.01); *F16K 31/002* (2013.01); *F16K 31/003* (2013.01); *F16K 31/02* (2013.01); *G05D 23/1852* (2013.01)

(58) Field of Classification Search
CPC .......... F16K 1/221; F16K 5/06; F16K 5/0652; F16K 17/386; F16K 25/005; F16K 27/0218; F16K 27/067; F16K 31/002; F16K 31/003; F16K 31/02; G05D 23/1852

See application file for complete search history.

(56) References Cited

U.S. PATENT DOCUMENTS

| | | |
|---|---|---|
| 3,613,732 A | 10/1971 | Willson et al. |
| 4,436,125 A | 3/1984 | Blenkush |
| 4,549,717 A * | 10/1985 | Dewaegheneire ...... F16K 17/38 137/457 |
| 4,570,851 A | 2/1986 | Cirillo |
| 4,806,815 A | 2/1989 | Honma |
| 4,979,672 A | 12/1990 | AbuJudom, II et al. |
| 5,273,254 A | 12/1993 | McNaughton et al. |

(Continued)

FOREIGN PATENT DOCUMENTS

| | | |
|---|---|---|
| DE | 3637102 A1 | 5/1988 |
| EP | 2239486 A1 | 10/2010 |

(Continued)

*Primary Examiner* — Marc Norman
(74) *Attorney, Agent, or Firm* — Harness, Dickey & Pierce, P.L.C.

(57) ABSTRACT

A valve apparatus employs a shape memory alloy. In another aspect, a shape memory member acts as a lock or trigger in combination with a separate actuator or spring to move a valve. Still another aspect uses an externally mounted shape memory member to rotate a valve if an unsafe condition causes movement of the member.

20 Claims, 6 Drawing Sheets

(56) References Cited

U.S. PATENT DOCUMENTS

| | | | |
|---|---|---|---|
| 5,367,997 A * | 11/1994 | Kawamura | F02D 11/10 |
| | | | 123/399 |
| 5,396,769 A | 3/1995 | Brudnicki | |
| 5,584,432 A | 12/1996 | Lockhart | |
| 5,711,508 A | 1/1998 | Schreiber et al. | |
| 5,865,418 A | 2/1999 | Nakayama et al. | |
| 6,050,295 A | 4/2000 | Meisinger et al. | |
| 6,247,678 B1 | 6/2001 | Hines et al. | |
| 6,499,952 B1 | 12/2002 | Jacot et al. | |
| 6,557,824 B1 | 5/2003 | Jenski, Jr. et al. | |
| 6,840,257 B2 | 1/2005 | Dario et al. | |
| 9,212,754 B2 | 12/2015 | Jackson, Jr. | |
| 2005/0173661 A1 | 8/2005 | Mignon et al. | |
| 2005/0178988 A1 | 8/2005 | Biehl et al. | |
| 2006/0091342 A1 | 5/2006 | Butera et al. | |
| 2006/0273276 A1 | 12/2006 | Moretti et al. | |
| 2011/0031743 A1 | 2/2011 | Chaupin | |
| 2012/0151913 A1 | 6/2012 | Foshansky | |
| 2013/0020794 A1 | 1/2013 | Stokes et al. | |
| 2016/0201816 A1 * | 7/2016 | Rastegar | F16K 31/002 |
| | | | 137/2 |

FOREIGN PATENT DOCUMENTS

| | | |
|---|---|---|
| GB | 1 267454 A | 3/1972 |
| JP | 2004019748 A | 1/2004 |
| JP | 2004052891 A | 2/2004 |
| JP | 2004156671 A | 6/2004 |
| JP | 2005315292 A | 11/2005 |
| JP | 2007315529 A | 12/2007 |
| KR | 20060082107 A | 7/2006 |
| KR | 20060110409 A | 10/2006 |
| WO | WO-9502143 A1 | 1/1995 |
| WO | WO-2012101067 A1 | 8/2012 |
| WO | WO-2012125360 A2 | 9/2012 |

* cited by examiner

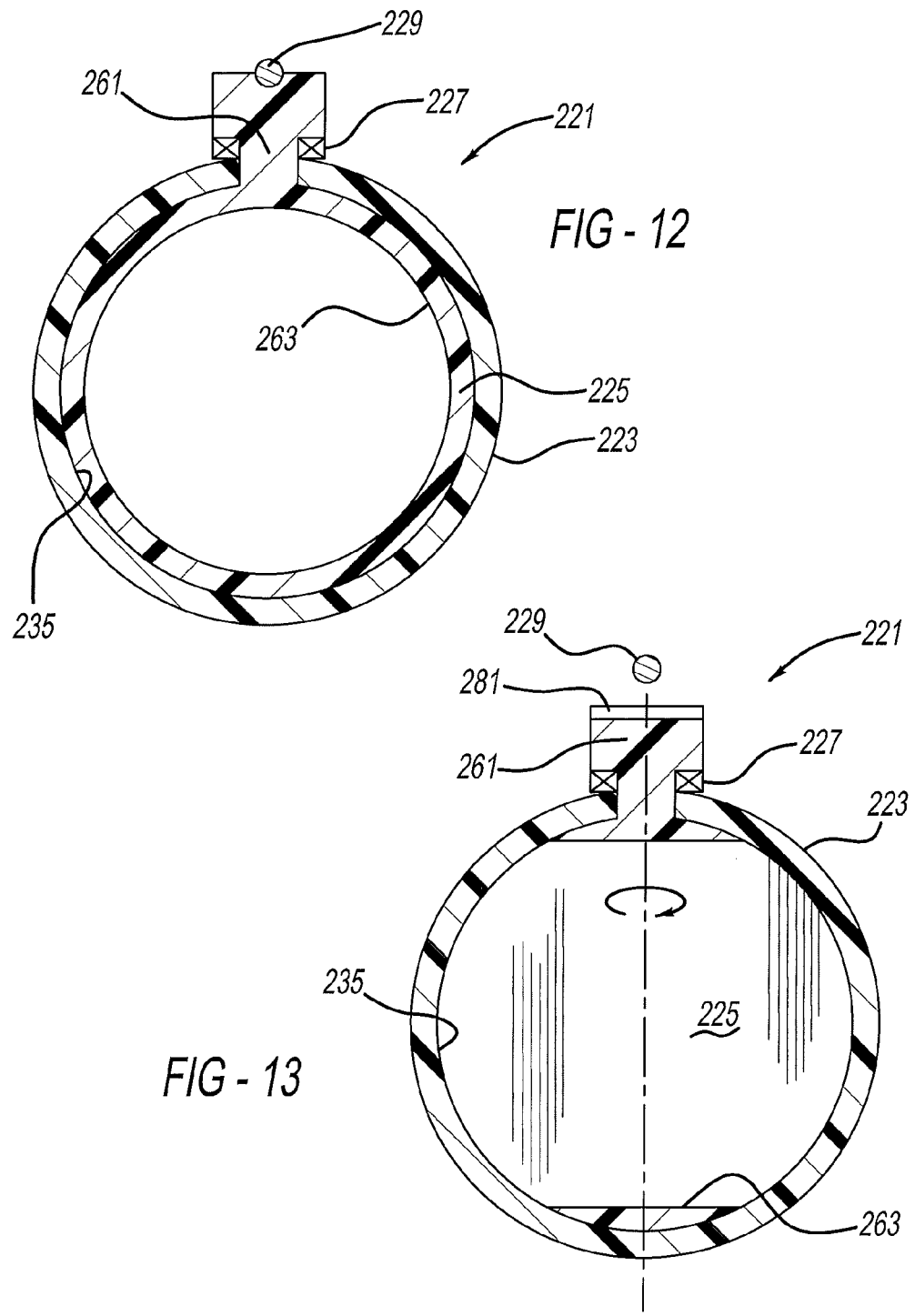

SHAPE MEMORY ALLOY VALVE

CROSS-REFERENCE TO RELATED APPLICATIONS

The present application is a divisional application of U.S. patent application Ser. No. 13/795,176, filed on Mar. 12, 2013, which is incorporated by reference herein.

BACKGROUND AND SUMMARY

The present disclosure relates generally to a valve and more particularly to a shape memory alloy valve.

Linearly moveable valves are known which use shape memory alloy ("SMA") wires to open and close the valves. It is noteworthy that such traditional valves used the SMA wires, often shaped as helically coiled springs, to directly actuate and linearly move the valves. Examples of these traditional valves are disclosed in U.S. Pat. No. 6,840,257 entitled "Proportional Valve with Shape Memory Alloy Actuator" which issued to Dario et al. on Jan. 11, 2005, and U.S. Pat. No. 5,865,418 entitled "Flow Control Valve" which issued to Nakayama et al. on Feb. 2, 1999. Both of these patents are incorporated by reference herein.

Another conventional valve uses coiled SMA wires for direct rotary actuation. This construction is disclosed in U.S. Pat. No. 5,396,769 entitled "Rotary Actuator" which issued to Brudnicki on Mar. 15, 1995. This patent is also incorporated by reference herein. The prior exemplary uses required both a heat-activated movement and a driving force by the same SMA wire which is not ideal. Furthermore, SMA wires are not as well suited for rotary motion as they are for linear motion.

In accordance with the present invention, a valve apparatus employs a shape memory alloy. In another aspect, a shape memory member acts as a lock or trigger in combination with a separate actuator or spring to move a valve. Still another aspect uses an externally mounted shape memory member to rotate a valve if an unsafe or targetted condition causes movement of the member. A method of operating a shape memory valve is also provided.

The present valve apparatus is advantageous over traditional valves. For example, the present valve is automatically controlled if an unsafe temperature or electrical signal-activated current moves the shape memory member. This is especially useful to prevent fuel or chemical remaining in a tube from draining onto a fire in a vehicular engine compartment or in a manufacturing plant. This is also beneficial for automatically allowing water to flow to a building sprinkler if a fire moves the shape memory member to open the valve. More reliable and consistent actuation forces and timing are achieved by separating a valve actuation mechanism from a shape memory lock or trigger. This separation also reduces part costs since a smaller quantity of the more expensive SMA is required as compared to inexpensive materials for a spring actuator. The actuation forces are also more predictable, tunable and consistent with off-the-shelf spring steel springs while not being significantly affected by environmental temperature changes as are SMA wires. Additional advantages and features of the present invention can be ascertained from the following description and claims, in addition to the appended drawings.

BRIEF DESCRIPTION OF THE DRAWINGS

FIG. 12 is a cross-sectional view showing another alternate embodiment of a valve apparatus in an open condition; and FIG. 13 is a cross-sectional view showing the alternate valve apparatus of FIG. 12 in a close condition.

DETAILED DESCRIPTION

Figure 1:
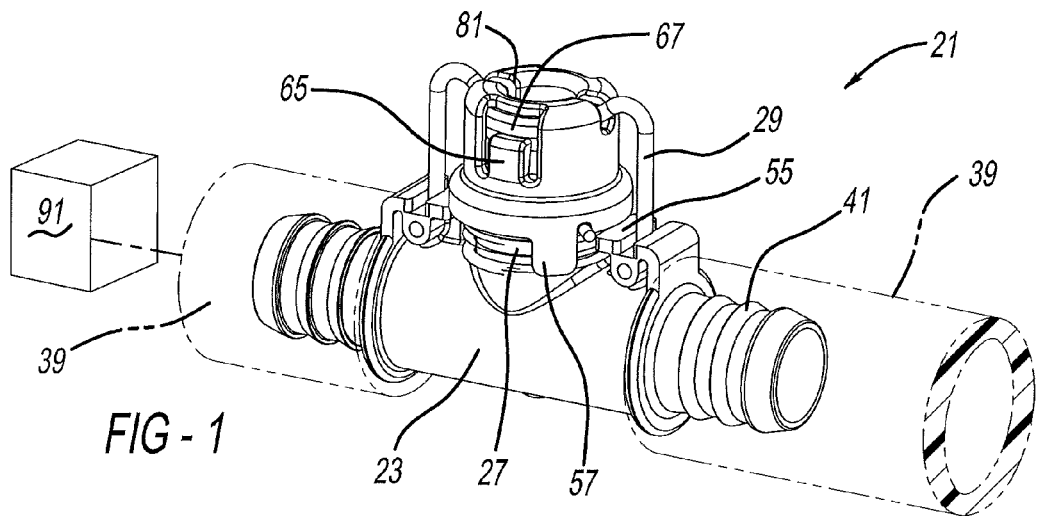
FIG. 1 is a perspective view showing a preferred embodiment of a valve apparatus of the present invention.
Figure 2:
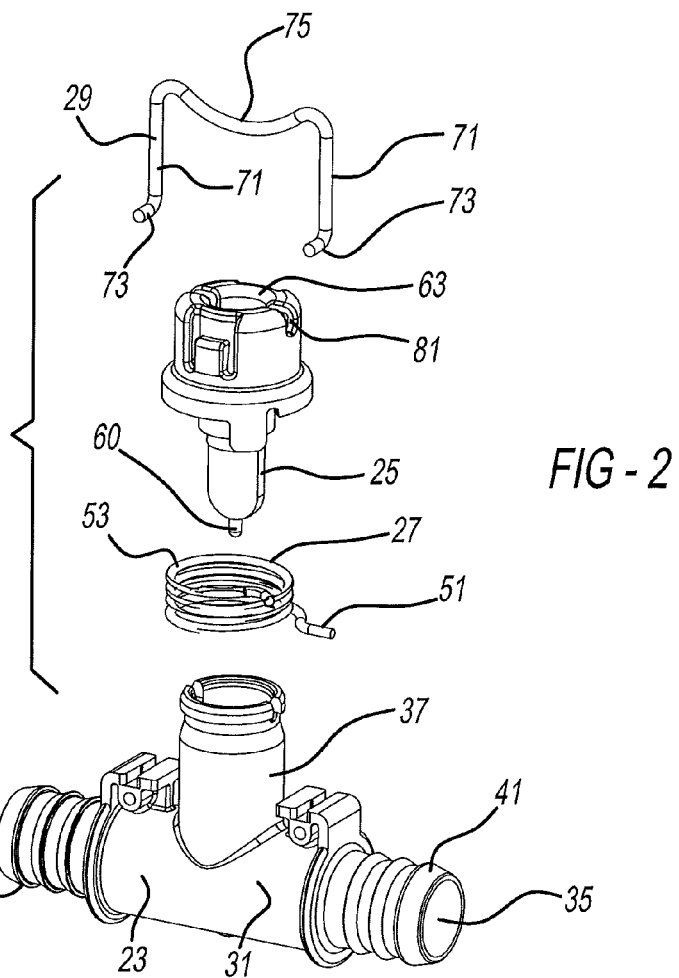
FIG. 2 is an exploded perspective view showing the preferred valve apparatus.
Figure 3:
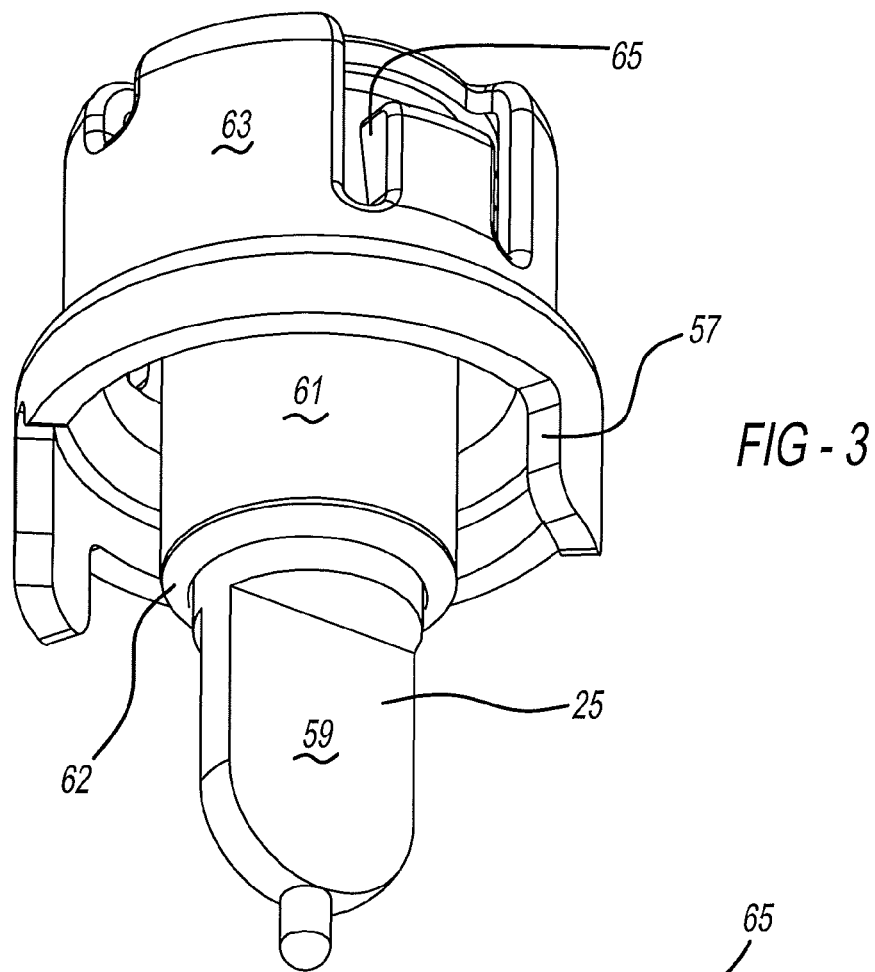
FIG. 3 is a perspective view showing a valve assembly employed in the preferred valve apparatus.
Figure 4:
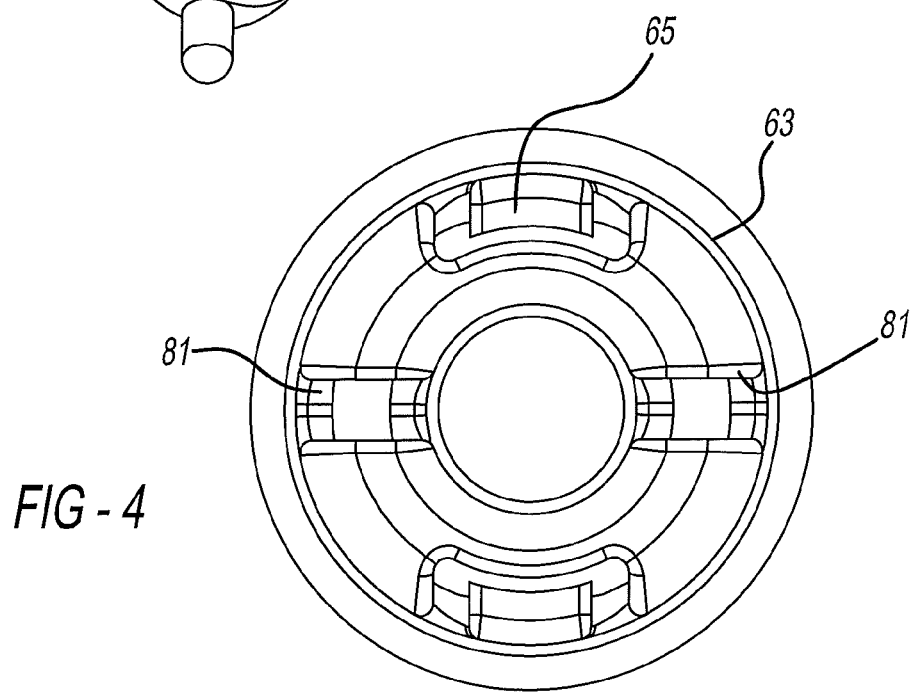
FIG. 4 is a top elevational view showing the valve assembly employed in the preferred valve apparatus.
Figure 5:
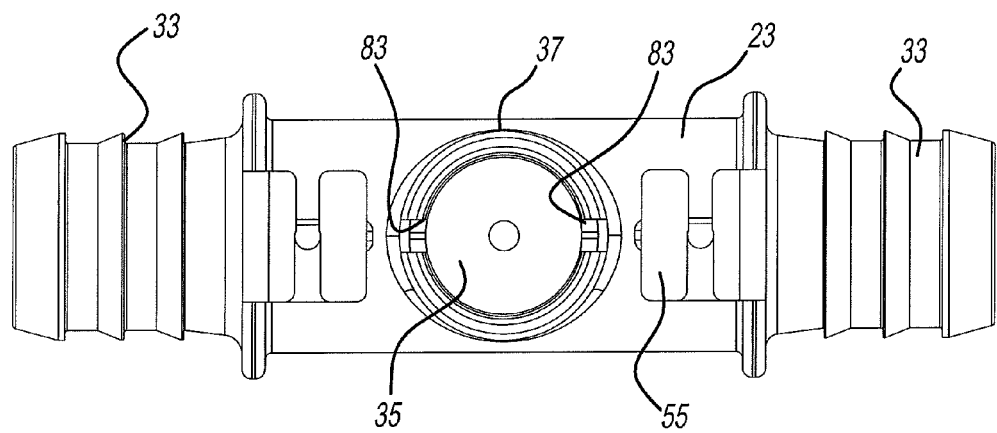
FIG. 5 is a top elevational view showing a housing employed in the preferred valve apparatus.

Referring to FIGS. 1-10, a preferred embodiment of a valve apparatus 21 includes a housing 23, a valve 25, a torsion spring actuator 27, and a shape memory alloy trigger or lock 29. Housing 23 includes an injection molded, engineering grade polymeric body 31 with a pair of quick connectors 33 on either end thereof defining a fluid-carrying and hollow passageway 35 internally therein. A hollow and cylindrical collar 37 perpendicularly upstands from body 31 such that the collar and quick connectors define a substantially inverted T-shape (as illustrated). Elongated and flexible conduits or tubes 39 externally surround spaced apart ridges 41 of quick connectors 33 so as to carry fluid from one tube 39 through passageway 35 of housing 23 and then through the other tube 39, when valve 25 is open. A circlip, compression ring or other external fastener removeably couples and clamps each tube 39 onto the associated quick connector.

Torsion spring actuator 27 includes a pair of laterally projecting tails 51 and a central helically looped section 53. Looped section 53 is concentrically mounted around an outside of collar 37 of housing. One tail 51 abuts against a side of a retension formation 55 upstanding from housing 23 and an opposite tail abuts against a tab 57 affixed to and moving with valve 25.

Valve 25 has butterfly style flow controlling faces 59 with an overmolded or assembled elastomeric seal on at least side edges thereof. Faces 59 are located within passageway 35 of housing and the side edges are curved to match an inside housing shape defining passageway 35. Furthermore, a centering pintle 60 downwardly projects from a distal end of valve faces 59 for receipt in a depression inside a bottom of passageway 35. A generally circular-cylindrical and hollow shaft 61 upwardly extends from faces 59 and concentrically extends through collar 37 of housing 23. An O-ring seal 62 is overmolded or assembled onto shaft 61. A laterally enlarged cap 63 extends from shaft 61 in a somewhat cup-shaped and concentric manner to sandwich collar 37 therebetween. A pair of flexible snap fit fingers 65 project from opposite sides of cap 63 for engagement with a peripherally enlarged lip 67 at a distal end of collar 37; this rotatably secures valve 25 to housing 23. Valve 25 is preferably injection molded from an engineering grade of polymeric material with an elastomeric material overmolded on faces 59 and the edges therebetween but not on pintle 60.

Shape memory alloy trigger or lock 29 is a generally inverted U-shaped (as illustrated) wire defined by a pair of generally parallel legs 71, with turned feet 73 on distal ends thereof, and an arcuate but unlooped and uncoiled middle bridging section 75 between the legs. SMA trigger 29 is preferably a nickel-titanium or copper zinc-aluminum metallic alloy. Feet 73 of SMA trigger 29 are trapped and retained within formations 55 external to housing 23. Middle bridging section 75 is arcuately depressed to engage within surfaces defining grooves, receptacles or slots 81 of valve cap 63, and also surfaces defining grooves, receptacles or slots 83 of housing collar 37. Grooves 81 and 83 are laterally aligned when valve 25 is in its nominal open operating position.

Figure 6:
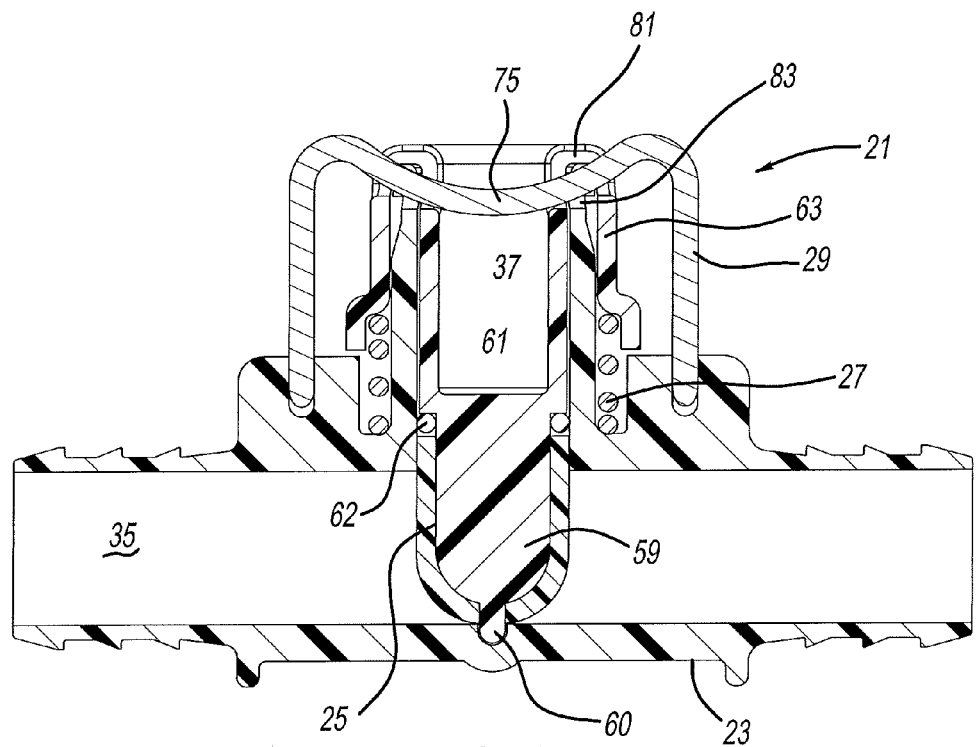
FIG. 6 is a cross-sectional view showing the preferred valve apparatus in an open operating condition.
Figure 7:
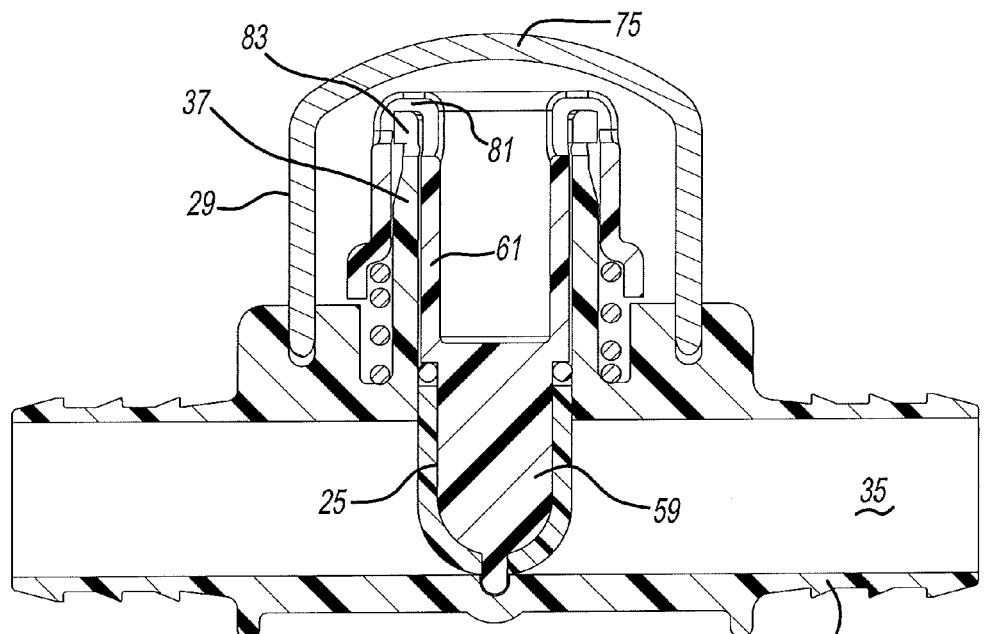
FIG. 7 is a cross-sectional view showing the preferred valve apparatus in an intermediate operating condition.

In operation as shown in FIGS. 6 and 7, valve 25 is in its nominal open position where flat faces 59 are parallel to an elongated fluid flow direction through passageway 35 of housing 23. This allows the fluid to flow therepast in a generally unobstructed manner. SMA trigger 29 locks valve 25 in the open position by engaging aligned grooves 81 and 83 (see FIGS. 4 and 5) of valve shaft 63 and housing collar 37, respectively. It is noteworthy that SMA trigger 29 is external to housing 23 for exposure to the environmental air, although a perforated cover may surround such.

With reference to FIG. 7, middle section 75 of SMA trigger 29 moves to an outwardly bulging and expanded orientation, disengaging and unlocking grooves 81 and 83, when SMA trigger 29 is heated past a movement or flexure transition temperature. This heating can be done by conducting an electrical current through SMA trigger 29, or through an environmental and external air temperature increase such as with a fire. If electricity is used, then SMA trigger acts as a resistor in an electrical circuit including a vehicular battery power supply, a ground, and a computer controller acting as a switch to energize the circuit based on a signal sent from an airbag deployment sensor, crash/rollover accelerometer sensor, engine temperature sensor or the like. For example, a 0.5-0.75 mm diameter SMA wire is employed for trigger 29 when a 12 volt power supply creates 4-6 amps of electricity.

Figure 8:
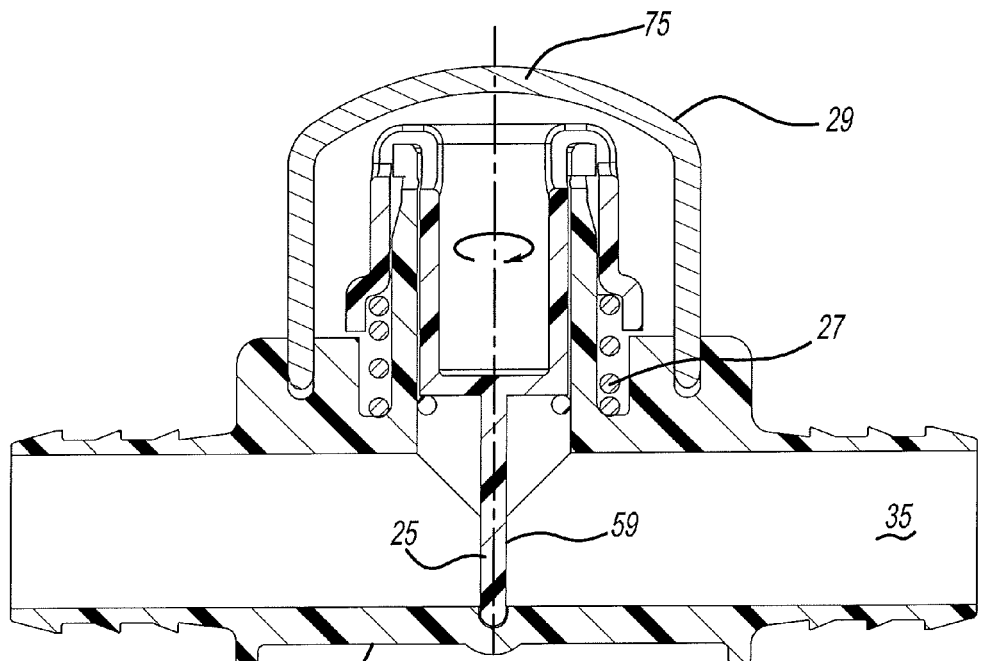
FIG. 8 is a cross-sectional view showing the preferred valve apparatus in a closed operating condition.
Figure 9:
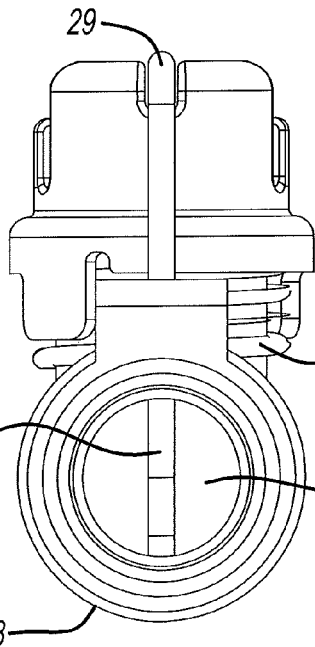
FIG. 9 is an end elevational view showing the preferred valve apparatus in an open operating condition.
Figure 10:
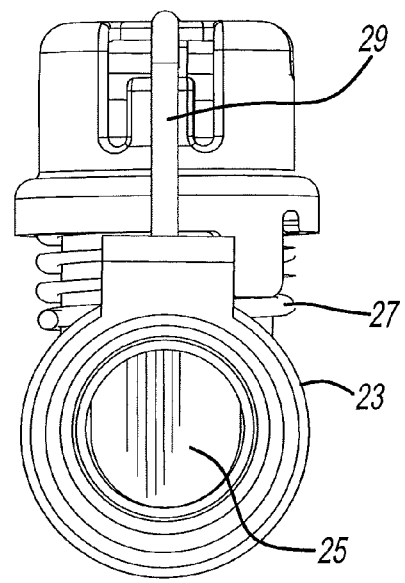
FIG. 10 is an end elevational view showing the preferred valve apparatus in a closed operating condition.

Torsion spring actuator 27 automatically rotates the integrated and single piece cap 63, shaft 61 and valve 29 to the closed position illustrated in FIGS. 8 and 10, when SMA trigger 29 releases the grooves. Thus, flat faces 59 of valve 25 are perpendicular to the elongated passageway 35, with the edges of valve 25 sealing against an inside surface of housing 23, thereby obstructing and blocking fluid flow through the housing. In this vehicular situation, fuel, such as gasoline, supplied by a fuel pump 91 which otherwise remains in fuel-carrying tube 39, is stopped from emptying past valve 25. Then when the dangerous condition ceases, a mechanic can manually rotate valve 25 back to its open position against the biasing force of spring 27 and reengage SMA trigger 29 in the grooves.

Referring to FIG. 1, another embodiment uses valve apparatus 21 in a chemical manufacturing plant. A chemical storage, refining or other processing device 91 supplies a chemical liquid or gaseous fluid through tubes 39. Valve 25 is automatically rotated closed in a fail-safe manner by spring actuator 27 if a fire or other dangerous environmental condition exists. Valve 25 and housing 23 are preferably made from cast or machined metal and of a larger size than in the vehicular version, however, SMA trigger 29, spring actuator 27 and valve 25 are otherwise similarly constructed and functioning to the vehicular system.

A further embodiment attaches a water sprinkler 91 to valve apparatus 21 for use in extinguishing fires in a building. This system is similar to the prior vehicular or manufacturing plant versions, however, the fail-safe mode opens the valve. This can be done by orienting valve shaft and housing collar grooves 81 and 83 perpendicular to those shown in FIGS. 4 and 5.

Figure 11:
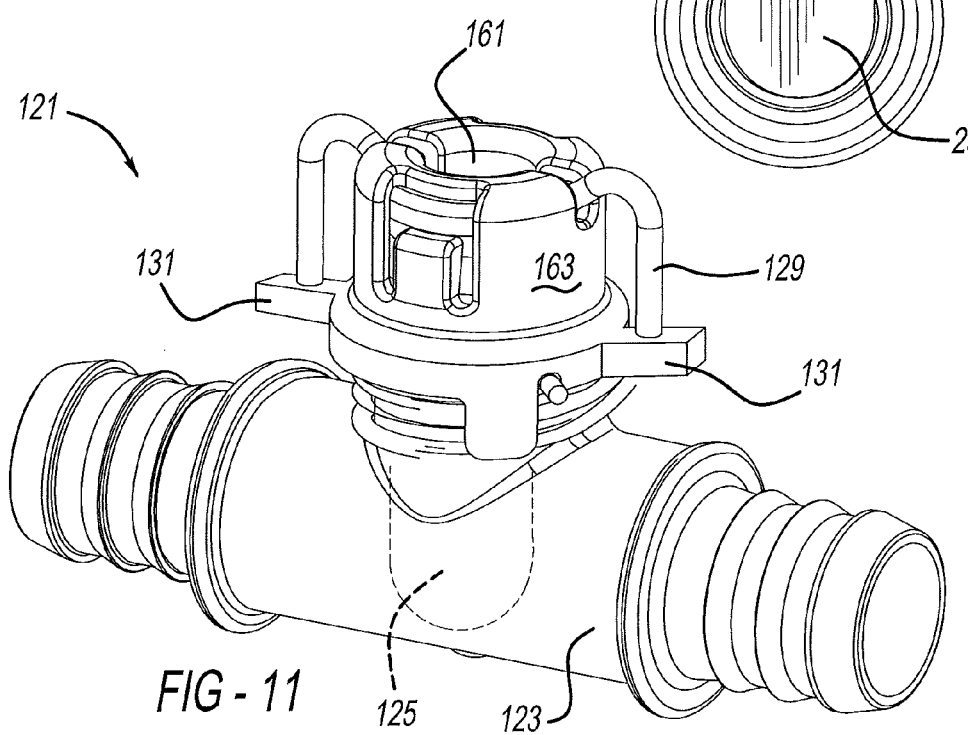
FIG. 11 is a perspective view showing an alternate embodiment of a valve apparatus.

An alternate embodiment valve apparatus 121 can be observed in FIG. 11. This device is identical in structure and function to that shown in FIGS. 1 and 2, except that the end feet of an SMA trigger 129 are secured to wings 131 laterally projecting from an outside of a cap 163 integrally coupled to a shaft 161 and a valve 125. This allows for easier modularized preassembly of SMA trigger 129 to valve 125 before it is moveably coupled to a quick connector housing 123.

FIGS. 12 and 13 show another alternate embodiment valve apparatus 221. A spherical ballcock valve 225 is located within a passageway 235 of a housing 223 with an integral shaft 261 extending therethrough. A circular-cylindrical fluid flow through-bore 263 extends through valve 225 for concentric alignment within housing passageway 235 when valve 225 is in its open position. A lateral groove 281 is in a top of shaft 261 to operably receive an SMA trigger 229 in its nominal and open condition (see FIG. 12). A torsion spring 227 is likewise provided with this embodiment as in the prior ones described hereinabove.

Various embodiments have been disclosed herein, but it should be appreciated that other variations may be made. For example, a leaf or tension spring can replace the torsion spring actuator although certain benefits will not be realized. Moreover, different housing shapes and constructions may be employed but various advantageous will not be achieved. Furthermore, it is envisioned that shape memory members of different shapes and materials (such as shape memory polymers) may engage/disengage these or other abutment surfaces and receptacles, however, certain benefits may be forfeited. It should also be appreciated that the present valve apparatus may be inverted or otherwise reoriented; thus, terms such as "top," "bottom," "upper," "lower," "upward," "downward" and the like should not be considered as limiting since they simply describe the exemplary embodiments as illustrated herein. The description of the invention is merely exemplary in nature and, thus, variations that do not depart from the gist of the invention are intended to be within the scope of the invention. Such variations are not to be regarded as a departure from the spirit and scope of the invention.

The invention claimed is:
1. A valve apparatus comprising:
a fluid valve;
a housing including an internal fluid-carrying passageway within which the fluid valve is located, the housing further including an external engagement surface;
a shaft attached to and operably moving with the fluid valve, the shaft having an abutment surface located external to the housing; and
a shape memory member located external to the housing and engaging the engagement surface of the housing in a first operating condition, the shape memory member also engaging the abutment surface of the shaft in the first operating condition, and the shape memory member disengaging at least one of the surfaces when in a different operating condition to allow the fluid valve to move, the operating conditions being changeable due to a change of at least one of: (a) temperature, and (b) electrical current.

2. The valve apparatus of claim 1, further comprising a spring being a separate part from the shape memory member, the spring automatically changing an orientation of the fluid valve when the shape memory member is heated to disengage the abutment surface of the shaft.

3. The valve apparatus of claim 2, wherein the spring is a torsion spring which rotates the fluid valve within the housing.

4. The valve apparatus of claim 1, wherein the shape memory member has a substantially inverted U-shape in at least one of the operating conditions, and the shape memory member is free of a coiled loop.

5. The valve apparatus of claim 1, wherein the shape memory member is a wire which is environmentally heat activated without use of electricity, such that the shape memory member automatically releases the fluid valve for automatic movement if a fire or dangerous temperature is present.

6. The valve apparatus of claim 1, wherein the housing further includes a polymeric quick connector with spaced apart ridges, a collar centrally projects from the housing concentric with the shaft, and the collar has the engagement surface thereon.

7. The valve apparatus of claim 1, wherein the engagement surface of the housing and the abutment surface of the shafts are part of grooves which are aligned when engaged by the shape memory member.

8. The valve apparatus of claim 1, wherein the fluid valve is a rotating butterfly valve with flat closing faces.

9. The valve apparatus of claim 1, wherein the fluid valve is a rotating and generally spherical ball valve with a bore therethrough.

10. A valve apparatus comprising:
a fluid valve;
a housing including an internal fluid-carrying passageway within which the fluid valve is located, the housing further including an external engagement surface;
a shaft attached to and operably moving with the fluid valve, the shaft having an abutment surface located external to the housing; and
a shape memory member located external to the housing and engaging the engagement surface of the housing in a first operating condition, the shape memory member also engaging the abutment surface of the shaft in the first operating condition, and the shape memory member disengaging at least one of the surfaces when in a different operating condition to allow the fluid valve to move.

11. The valve apparatus of claim 10, further comprising a spring being a separate part from the shape memory member, the spring automatically changing an orientation of the fluid valve when the shape memory member is heated to disengage the abutment surface of the shaft.

12. The valve apparatus of claim 11, wherein the spring is a torsion spring which rotates the fluid valve within the housing.

13. The valve apparatus of claim 10, wherein the shape memory member has a substantially inverted U-shape in at least one of the operating conditions, and the shape memory member is free of a coiled loop.

14. The valve apparatus of claim 10, wherein the shape memory member is a wire which is environmentally heat activated without use of electricity, such that the shape memory member automatically releases the fluid valve for automatic movement if a fire or dangerous temperature is present.

15. The valve apparatus of claim 10, wherein the housing further includes a polymeric quick connector with spaced apart ridges, a collar centrally projects from the housing concentric with the shaft, and the collar has the engagement surface thereon.

16. The valve apparatus of claim 10, wherein the engagement surface of the housing and the abutment surface of the shafts are part of grooves which are aligned when engaged by the shape memory member.

17. The valve apparatus of claim 10, wherein the fluid valve is a rotating butterfly valve with flat closing faces.

18. The valve apparatus of claim 10, wherein the fluid valve is a rotating and generally spherical ball valve with a bore therethrough.

19. A valve apparatus comprising:
a fluid valve;
a polymeric connector body including an internal fluid-carrying passageway within which the fluid valve is located, the polymeric connector body further including an external engagement surface;
an abutment surface moveable with the valve;
a shape memory member located external to the polymeric connector body and engaging the engagement surface of the polymeric connector body in a first operating condition, the shape memory member also engaging the abutment surface in the first operating condition, and the shape memory member disengaging at least one of the surfaces when in a different operating condition to allow the fluid valve to move, the operating conditions being changeable due to a change of at least one of: (a) temperature, and (b) electrical current; and
a spring operably rotating the fluid valve within the connector body if there is a change in the operating conditions.

20. The valve apparatus of claim 19, wherein the shape memory member is a wire which is environmentally heat activated without use of electricity, such that the shape memory member automatically releases the fluid valve for automatic movement if a fire or dangerous temperature is present.

* * * * *